United States Patent
Rahman et al.

(10) Patent No.: US 8,051,202 B2
(45) Date of Patent: Nov. 1, 2011

(54) METHOD AND APPARATUS FOR PROVIDING ALARM CORRELATION FOR A GATEWAY ROUTER

(75) Inventors: Moshiur Rahman, Marlboro, NJ (US); Carolyn Bekampis, Wayside, NJ (US); Deniz Seden, Middletown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 150 days.

(21) Appl. No.: 12/193,597

(22) Filed: Aug. 18, 2008

(65) Prior Publication Data

US 2010/0042744 A1 Feb. 18, 2010

(51) Int. Cl.
*G06F 15/173* (2006.01)
*G06F 15/16* (2006.01)

(52) U.S. Cl. ........ 709/239; 709/201; 709/238; 713/170; 370/401

(58) Field of Classification Search .................. 709/201, 709/238–239; 713/168–172; 370/400–401
See application file for complete search history.

(56) References Cited

U.S. PATENT DOCUMENTS

| | | | | |
|---|---|---|---|---|
| 5,790,548 A * | 8/1998 | Sistanizadeh et al. | ........ | 370/401 |
| 6,704,289 B1 * | 3/2004 | D'Souza et al. | ........... | 709/224 |
| 7,007,104 B1 * | 2/2006 | Lewis et al. | ................... | 709/246 |
| 7,043,661 B2 * | 5/2006 | Valadarsky et al. | ........... | 714/4.1 |
| 7,302,704 B1 * | 11/2007 | Elliott | .......................... | 709/229 |
| 7,603,480 B2 * | 10/2009 | Imai et al. | ..................... | 709/239 |
| 7,650,502 B2 * | 1/2010 | Sheymov | ...................... | 713/172 |
| 7,712,133 B2 * | 5/2010 | Raikar et al. | .................... | 726/23 |
| 2004/0221296 A1 * | 11/2004 | Ogielski et al. | .............. | 719/313 |
| 2005/0166099 A1 * | 7/2005 | Shyu | .............................. | 714/47 |
| 2008/0141332 A1 * | 6/2008 | Treinen | .......................... | 726/25 |

* cited by examiner

Primary Examiner — Bharat Barot

(57) ABSTRACT

A method and an apparatus for providing alarm correlation for a gateway router are disclosed. For example, the method receives one or more alarms, wherein each of the one or more alarms having a message signature in accordance with a router redundancy signaling protocol. The method then identifies one or more root causes by correlating the one or more alarms in accordance with the message signatures.

16 Claims, 3 Drawing Sheets

METHOD AND APPARATUS FOR PROVIDING ALARM CORRELATION FOR A GATEWAY ROUTER

The present invention relates generally to communications networks and, more particularly, to a method and apparatus for providing alarm correlation for a gateway router, e.g., a gateway router in a packet network such as an Internet Protocol (IP) network.

BACKGROUND OF THE INVENTION

Today's communications networks are often designed with built-in redundancy to increase availability. For example, enterprise Virtual Local Area Networks (VLANs) may be dual-homed across two gateway routers for routing and connectivity to external networks over an Internet Protocol (IP) network. One of the gateway routers may be designated as an active router and the second router may be designated as a standby router. The redundancy may be supported with floating virtual addresses using a redundancy protocol such as Virtual Router Redundancy Protocol (VRRP). The VRRP is configured on each VLAN interface that is connected to the gateway routers.

When a failover from the active gateway router to the standby gateway router occurs, all network elements that are connected to the gateway routers are notified about the failover. The network elements in turn create and send alarms to one or more fault management systems. Thus, for a failover of a gateway router, the fault management system may receive numerous redundant alarms for the same failure. Furthermore, the redundant alarms may create multiple tickets for a single cause. Processing of multiple tickets increases the cost of operating and maintaining the network.

SUMMARY OF THE INVENTION

In one embodiment, the present invention discloses a method and apparatus for providing alarm correlation for a gateway router. For example, the method receives one or more alarms, wherein each of the one or more alarms having a message signature in accordance with a router redundancy signaling protocol. The method then identifies one or more root causes by correlating the one or more alarms in accordance with the message signatures.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing alarm correlation for a gateway router, e.g., a gateway router in a packet network such as an Internet Protocol (IP) network. It should be noted that the present invention can be implemented for a gateway router irrespective of the type of the network.

Figure 1:
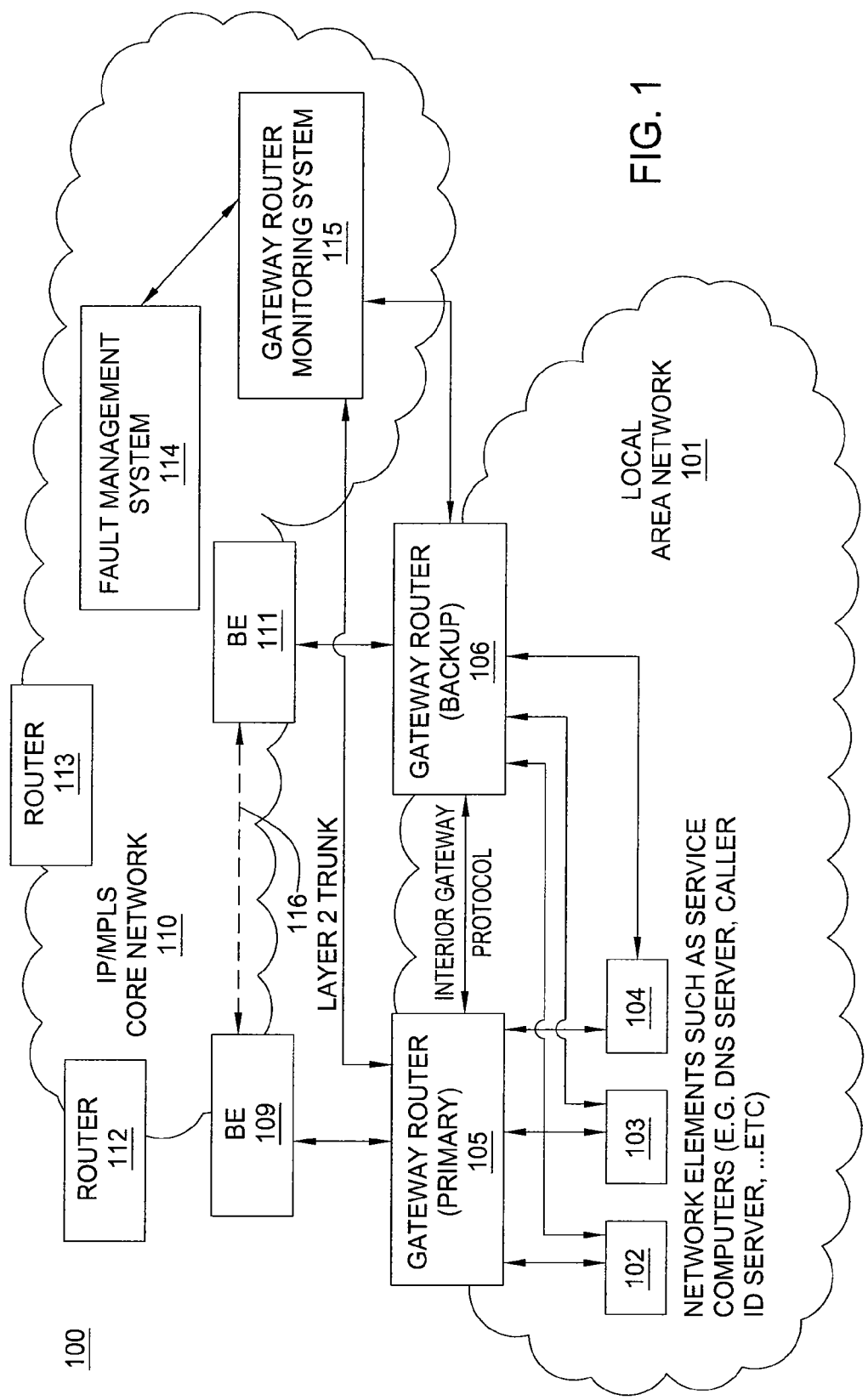
FIG. 1 illustrates an exemplary network of the current invention for providing alarm correlation for a gateway router.

FIG. 1 illustrates an exemplary network 100 of the current invention for providing alarm correlation for a gateway router. For example, the illustrative network 100 comprises a Local Area Network (LAN) 101 in communications with an Internet Protocol over Multi Protocol Label Switched (IP/MPLS) core network 110. The LAN 101 may comprise gateway routers 105 and 106, and various network elements 102-104 (e.g., servers, computers, etc.). The IP/MPLS core network 110 may comprise border elements 109 and 111, routers 112 and 113, a fault management system 114, and a gateway router monitoring system 115.

In one embodiment, the various network elements 102-104 utilize gateway routers 105 and/or 106 for external connectivity and routing. The gateway routers 105 and 106 are monitored by the gateway router monitoring system 115. Gateway router 105 accesses the IP/MPLS core network 110 via Border Element (BE) 109, whereas gateway router 106 accesses the IP/MPLS core network 110 via Border Element (BE) 111. In one embodiment, the border elements 109 and 111 are connected via a Layer 2 trunk 116 for providing a router redundancy signaling protocol, e.g., a Virtual Router Redundancy Protocol (VRRP).

In one example, the network elements 102-104 are dual-homed across the gateway routers 105 and 106 for redundancy purposes. As such, VRRP is configured for each virtual LAN interface connected to one or more gateway routers 105 and/or 106. If a failover of a gateway router occurs (e.g. from gateway router 105 to gateway router 106), VRRP is invoked and the networks elements 102-104 are notified of the failover. The network elements 102-104 may, in turn, send sympathy alarms to the fault management system 114 indicating the same failover event.

In one embodiment, the current invention provides alarm correlation for a gateway router using one or more VRRP message signatures received from one or more network elements. A VRRP message signature refers to a message sent by a network element to a fault management system to indicate that a VRRP redundancy protocol is invoked. In one embodiment, the VRRP message signature is sent with the sympathy alarm. In another embodiment, the VRRP message signature may be sent as a separate alarm. For example, if a failover from gateway router 105 to gateway router 106 occurs, VRRP message signature indicating that a VRRP redundancy protocol is invoked may be received by the fault management system 114 from one or more of the network elements 102-104. The fault management system 114 may then correlate the one or more alarms and identify a root cause as being the gateway router failover, i.e., a single failover event.

In one embodiment, the fault management system will generate a ticket for the root cause. For example, if the fault management system identifies that the one or more sympathy alarms received from one or more network elements are related to a particular gateway router failover, then the fault management system will generate a single ticket for a gateway router trouble. The network service provider may then initiate one or more remedial steps.

In one embodiment, the fault management system may suppress one or more alarms received from one or more network elements for a particular gateway router failover such that multiple tickets are not generated for one root cause alarm. For example, a single ticket may be generated for a failure or degradation of a particular gateway router.

In one embodiment, the fault management system may receive a heartbeat down message from a gateway router and/or a gateway router monitoring system. For example, a gateway monitoring system may monitor gateway routers to determine when a gateway router is not functioning. For example, a heartbeat signal may be automatically gathered by a monitoring system 115. In another example, a monitoring system may actively query the status of gateway routers periodically. If a gateway router fails to provide a successful response, then the gateway router monitoring system may have detected a potential problem and it will notify the fault management system. If a fault management system receives a heartbeat down message for a gateway router, then the heartbeat down message may be used along with the VRRP message signatures for correlation of gateway router alarms.

In one embodiment, a fault management system may query one or more network elements that send alarms to determine the status of the network elements. For example, the fault management system may ping each of the network elements that sent one or more alarms (sympathy alarms) with a VRRP message signature. If a network element that sent one or more alarms with a VRRP message fails to respond to the ping, the network element is then considered inactive. That means, the status of the network element is inactive. If the network element is inactive, the alarm and/or VRRP message signature received from the network element may be excluded by the fault management system for alarm correlation related to a gateway router. For example, if 10% of the network elements that sent the VRRP message signatures are non-responsive to pings (inactive network elements), only the alarms received from the other 90% of the network elements (the active network elements) that sent the VRRP message signatures are considered to determine whether or not the root cause is a gateway router failover. For example, the 90% of the network elements are in active status and the data/alarm received from the network elements in active status may be trusted.

Those skilled in the art realize that the network in FIG. 1 may be expanded by adding routers, servers, local area networks, etc. without altering the current invention.

Figure 2:
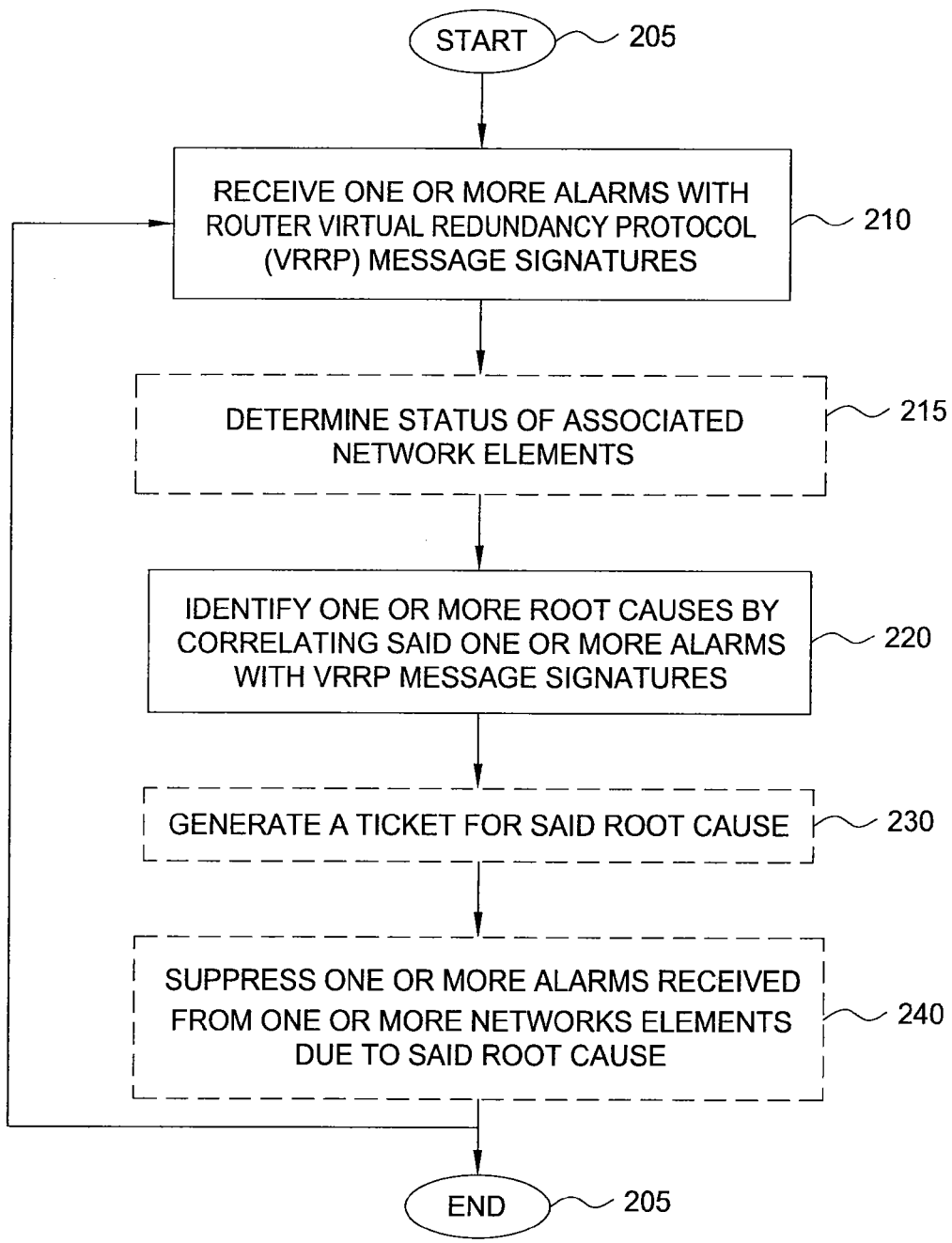
FIG. 2 illustrates a flowchart of a method for providing alarm correlation for a gateway router.

FIG. 2 illustrates a flowchart of a method 200 for providing alarm correlation for a gateway router. For example, method 200 can be implemented by a fault management system. Method 200 starts in step 205 and proceeds to step 210.

In step 210, method 200 received one or more alarms with Virtual Router Redundancy Protocol (VRRP) message signatures. For example, one or more network elements in communication with a fault management system send one or more alarms with VRRP message signatures to indicate that a VRRP redundancy protocol is invoked for a gateway router failover.

For example, if a failover from an active gateway router to a standby gateway router occurs, VRRP message signatures indicating that a VRRP redundancy protocol is invoked may be received by a fault management system from one or more network elements using those gateway routers for communication, e.g., to access the Internet. For example, a network element may send the original sympathy alarm and then sends an alarm with an VRRP message signature, or the VRRP message signature may be included in the sympathy alarm.

In step 215, method 200 may optionally request status from the network elements that generated the one or more alarms with Virtual Router Redundancy Protocol (VRRP) message signatures. If the network elements properly respond with an "active" status response, then the one or more alarms with Virtual Router Redundancy Protocol (VRRP) message signatures received from the active status network elements will be used in step 220. However, if some of the network elements fail to properly respond with an "active" status response, then the one or more alarms with Virtual Router Redundancy Protocol (VRRP) message signatures received from these "nonresponsive" network elements will not be used in step 220.

In step 220, method 200 identifies one or more root causes by correlating the one or more alarms with VRRP message signatures. For the example above, the fault management system may identify the root cause as being the failover from the active gateway router to a standby gateway router. It should be noted that the heartbeat down message from a gateway router or a gateway monitoring system as discussed above, if available, will also be used in the correlation. Thus, the VRRP message signatures will be used in assisting the correlation of the alarms.

In optional step 230, method 200 generates a ticket for the root cause. For example, if the fault management system identified that one or more alarms are received from one or more network elements for a gateway router failover, the fault management system may generate a ticket for the gateway router whose failure or degradation caused the failover to another gateway router.

In optional step 240, method 200 suppresses one or more alarms received from one or more network elements due to the root cause. For example, the method suppresses alarms from network elements that sent the VRRP message signatures. Namely, if these alarms have been correlated to a root cause identified in step 220 as a gateway router failover, then there is no need to address these additional alarms. Method 200 then ends in step 250 or returns to step 210.

It should be noted that although not specifically specified, one or more steps of method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

Figure 3:
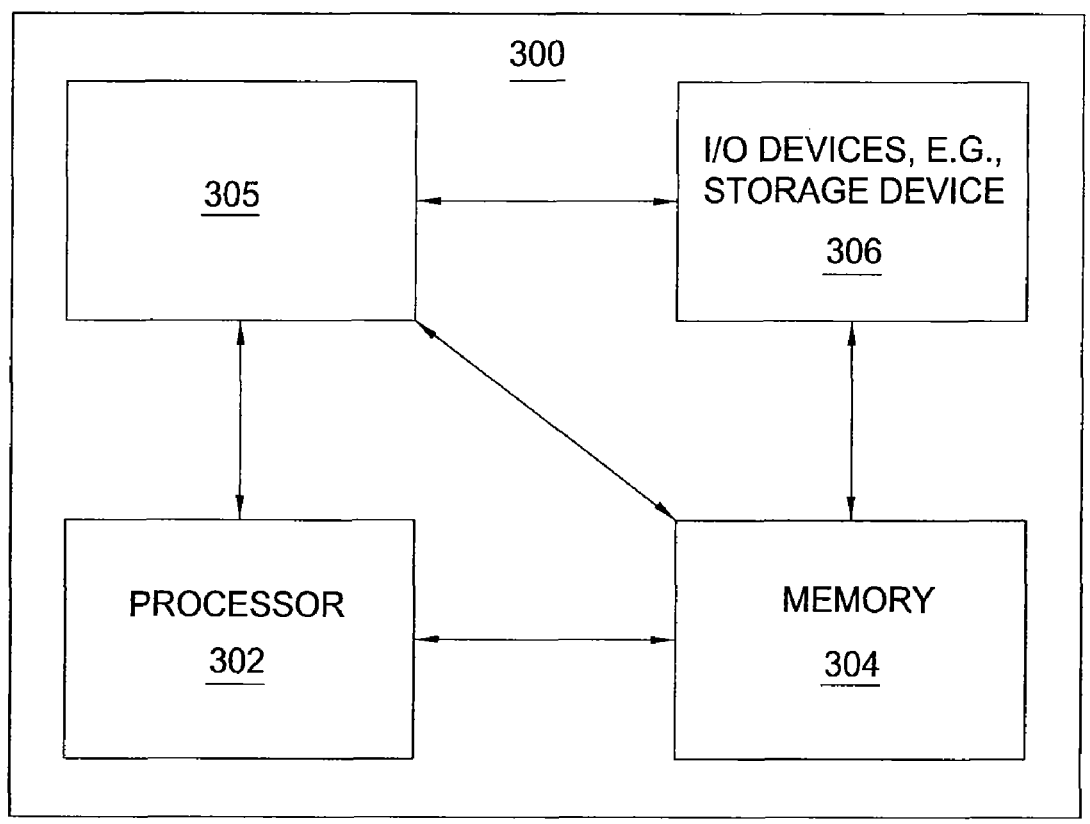
FIG. 3 illustrates a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for providing alarm correlation for a gateway router, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 305 for providing alarm correlation for a gateway router can be loaded into memory 304 and executed by processor 302 to implement the functions as discussed above. As such, the present process 305 for providing alarm correlation for a gateway router (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus for providing an alarm correlation for a gateway router, comprising:
    a processor configured to:
        receive a plurality of alarms, wherein each of the plurality of alarms includes a message signature indicating that a router redundancy signaling protocol has been invoked;
        determine a status of each network element of a plurality of network elements that sent one of the plurality of alarms; and
        identify a root cause by correlating the plurality of alarms in accordance with the message signature, wherein the processor is further configured to identify the root cause by correlating only those alarms received from network elements having an active status.

2. The apparatus of claim 1, wherein the router redundancy signaling protocol comprises a virtual router redundancy protocol.

3. The apparatus of claim 1, wherein the processor is further configured to:
    generate a ticket for the root cause.

4. The apparatus of claim 1, wherein the processor is further configured to:
    suppress an alarm received from a network element associated with the root cause.

5. A method for providing an alarm correlation for a gateway router, comprising:
    receiving a plurality of alarms, wherein each of the plurality of alarms includes a message signature indicating that a router redundancy signaling protocol has been invoked;
    determining a status of each network element of a plurality of network elements that sent one of the plurality of alarms; and
    identifying a root cause by correlating the plurality of alarms in accordance with the message signature, wherein the identifying the root cause is performed by correlating only those alarms received from network elements having an active status, wherein the receiving, determining and identifying are performed by a processor.

6. The method of claim 5, wherein the router redundancy signaling protocol comprises a virtual router redundancy protocol.

7. The method of claim 5, further comprising:
    generating a ticket for the root cause.

8. The method of claim 5, further comprising:
    suppressing an alarm received from a network element associated with the root cause.

9. The method of claim 5, further comprising:
    receiving a heartbeat down message from the gateway router.

10. The method of claim 9, wherein the heartbeat down message is used for the identifying the root cause.

11. A computer-readable medium having stored thereon a plurality of instructions, the plurality of instructions including instructions which, when executed by a processor, cause the processor to perform a method for providing an alarm correlation for a gateway router, comprising:
    receiving a plurality of alarms, wherein each of the plurality of alarms includes a message signature indicating that a router redundancy signaling protocol has been invoked;
    determining a status of each network element of a plurality of network elements that sent one of the plurality of alarms; and
    identifying a root cause by correlating the plurality of alarms in accordance with the message signature, wherein the identifying the root cause is performed by correlating only those alarms received from network elements having an active status.

12. The computer-readable medium of claim 11, wherein the router redundancy signaling protocol comprises a virtual router redundancy protocol.

13. The computer-readable medium of claim 11, further comprising:
    generating a ticket for the root cause.

14. The computer-readable medium of claim 11, further comprising:
    suppressing an alarm received from a network element associated with the root cause.

15. The computer-readable medium of claim 11, further comprising:
    receiving a heartbeat down message from the gateway router.

16. The computer-readable medium of claim 15, wherein the heartbeat down message is used for the identifying the root cause.

* * * * *